(12) United States Patent
Trogolo et al.

(10) Patent No.: US 8,238,948 B2
(45) Date of Patent: Aug. 7, 2012

(54) METHOD FOR EXPLOITING SIGNALLING MESSAGES IN A WIRELESS COMMUNICATION NETWORK

(75) Inventors: Alessandro Trogolo, Turin (IT); Pacio Goria, Turin (IT); Enrico Buracchini, Turin (IT)

(73) Assignee: Telecom Italia S.p.A., Milan (IT)

( * ) Notice: Subject to any disclaimer, the term of this patent is extended or adjusted under 35 U.S.C. 154(b) by 1119 days.

(21) Appl. No.: 12/084,966

(22) PCT Filed: Nov. 15, 2005

(86) PCT No.: PCT/EP2005/012240
§ 371 (c)(1),
(2), (4) Date: May 14, 2008

(87) PCT Pub. No.: WO2007/057031
PCT Pub. Date: May 24, 2007

(65) Prior Publication Data
US 2009/0098892 A1    Apr. 16, 2009

(51) Int. Cl.
*H04W 4/00* (2009.01)
(52) U.S. Cl. ....................................... 455/466
(58) Field of Classification Search ................ 455/466
See application file for complete search history.

(56) References Cited

U.S. PATENT DOCUMENTS

| | | | |
|---|---|---|---|
| 5,751,723 | A | 5/1998 | Vanden Heuvel et al. |
| 6,807,528 | B1 | 10/2004 | Truman et al. |
| 2002/0174276 | A1* | 11/2002 | Jiang .............................. 710/105 |
| 2003/0081635 | A1* | 5/2003 | Ando et al. .................... 370/528 |
| 2003/0157949 | A1 | 8/2003 | Sarkkinen et al. |
| 2005/0089000 | A1* | 4/2005 | Bae et al. ....................... 370/338 |
| 2006/0143444 | A1* | 6/2006 | Malkamaki et al. ........... 713/160 |

FOREIGN PATENT DOCUMENTS

| | | |
|---|---|---|
| JP | 05-130131 | 5/1993 |
| JP | 10-84389 | 3/1998 |
| JP | 2005-217626 | 8/2005 |

OTHER PUBLICATIONS

3rd Generation Partnership Project; Technical Specification Group Radio Access Network; "Radio Resource Control (RRC) protocol specification" (Release 1999), 3GPP TS 25.331 V3.21.0, pp. 1-879, (Dec. 2004).

(Continued)

*Primary Examiner* — Marisol Figueroa
(74) *Attorney, Agent, or Firm* — Finnegan, Henderson, Farabow, Garrett & Dunner, L.L.P.

(57) ABSTRACT

A method of exploiting a signaling message related to a predetermined OSI layer of a wireless communication system and adapted to transmit signaling information specific of the OSI layer for transmitting data different from the signaling information, includes: ascertaining the presence of unallotted space in the signaling message; based on the ascertained presence of unallotted space, determining an amount of transmissible data different from the signaling information; and modifying the signaling message by filling at least part of the unallotted space with the amount of transmissible data. The method is in particular useful in cellular telephony networks like 2G and 3G networks, in 802.1x networks and broadcasting ones such as DVBs.

25 Claims, 7 Drawing Sheets

OTHER PUBLICATIONS

3rd Generation Partnership Project; Technical Specification Group GSM/EDGE Radio Access Network; "Mobile radio interface layer 3 specification; Radio Resource Control Protocol" (Release 1999), 3GPP TS 04.18 V8.26.0, pp. 1-315 (Apr. 2005).

3rd Generation Partnership Project; Technical Specification Group Terminals; "Common test environments for User Equipment (UE) conformance testing" (Release 1999), 3GPP TS 34.108 V3.15.0, pp. 1-566, (Mar. 2004).

Translation of JP 2008-540458 Office Action dated Jun. 1, 2011.

Machine Translation of JP 05-130131, filed Oct. 31, 1991, published May 25, 1993.

Machine Translation of JP 2005-217626, filed Jan. 28, 2004, published Aug. 11, 2005.

"Universal Mobile Telecommunications System (UMTS); Radio Resource Control (RRC) Protocol Specification, (3GPP TS 25.331 Version 6.7.0 Release 6)" ETSI TS 125 331, published Sep. 2005.

* cited by examiner

METHOD FOR EXPLOITING SIGNALLING MESSAGES IN A WIRELESS COMMUNICATION NETWORK

CROSS REFERENCE TO RELATED APPLICATION

This application is a national phase application based on PCT/EP2005/012240, filed Nov. 15, 2005, the content of which is incorporated herein by reference.

BACKGROUND OF THE INVENTION

1. Field of the Invention

The present generally relates to the field of telecommunications, particularly to wireless communications, for example to digital mobile telephony networks (e.g. GSM, GPRS, EDGE, UMTS, CDMAONE or CDMA2000 networks) and other wireless communication networks like those complying with the IEEE 802.11 standard (WiFi networks or WLANs) and 802.16 ones (eg Wimax, 802.16e or Wibro) or the ones dedicated to broadcasting operation such as DVB-T, DVB-S and DVB-H.

2. Description of Related Art

Enhancing the capabilities of telecommunication systems, in terms of amount of information that can be exchanged, is an everlasting aim.

Modern telecommunication networks, such as for example digital mobile, cellular telephony networks like GSM (Global System for Mobile communications), GPRS (General Packet Radio Service), EDGE (Enhanced Data rate for GSM Evolution) and, ultimately, UMTS (Universal Mobile Telecommunication System) networks, and wireless packet data networks like WiFi (Wireless Fidelity) networks, are intended to support broadband communications, e.g. for enabling video calls, Internet surfing, and the like.

In the years, the demand for increased communication capabilities has been satisfied by setting up new standards, and deploying new networks complying therewith. For example, after the introduction of second-generation (2G) cellular networks, like those complying with the GSM standard, the GPRS and then the EDGE standards have been set up, so as to add packet-switched communication capabilities to the original, circuit-switched 2G network. As a further step, the introduction of third-generation (3G) cellular networks, like those complying with the UMTS, was intended to further increase the wireless communication capabilities.

However, developing a new standard and deploying new networks complying therewith involves high investments. Moreover, the impact of new network standards on the already deployed networks has to be carefully evaluated, especially when the current and the new communication systems have to share the same frequency band: interference problems due to the coexistence of the two systems might as a matter of fact worsen the communications performance.

These efforts, fully justified when the goal is a substantial increase in performance, may in some cases not be completely justified, particularly when a small increase in the communication capabilities would be sufficient.

Thus, efficiently using the licensed or allowed bandwidth of an already existing and deployed communication network is of primary importance for achieving better communication capabilities.

SUMMARY OF THE INVENTION

The Applicant has tackled the problem of enhancing the communication capabilities of a wireless communication system, particularly a digital one.

In particular, the Applicant has observed that in several cases it would be desirable to enhance the communication capabilities of the wireless communication system without having to heavily modifying the system as currently deployed, and/or to deploy a new system, possibly complying with a new standard, but by efficiently exploiting the functionalities already offered by the current communication system.

The Applicant has found that the communications capabilities of a wireless communication system can be enhanced by exploiting the existing signaling messaging provided for in a predetermined OSI (Open System Interconnect) layer of the communication system for carrying information different from the signaling information of that OSI layer.

For the purposes of the present invention, by signaling messaging or, similarly, signaling message at a generic layer of the ISO (International Standards Organization) OSI (Open System Interconnect) model of network there is intended any message, specific of that OSI layer and intended to transport signaling information.

The information that can be transmitted may be of the most diverse nature, and include for example signaling information of the OSI layers above the OSI layer of which signaling is exploited.

In greater detail, the Applicant has observed that signaling messages have very often a predetermined, fixed length, which is not always fully exploited for carrying the signaling information; in these cases, the unused space of the signaling messages is wasted, simply filled in with useless, so-called "padding" bits.

Thus, according to an aspect of the present invention, a method is provided of exploiting a signaling message related to a predetermined OSI layer of a wireless communication system and adapted to transmit signaling information specific of said OSI layer for transmitting data different from said signaling information.

The method comprises:
  ascertaining the presence of unallotted space in said signaling message;
  based on the ascertained presence of unallotted space, determining an amount of transmissible data different from said signaling information;
  modifying the signaling message by filling at least part of the unallotted space with said amount of transmissible data.

According to another aspect of the present invention, a method is provided of receiving a signaling message related to a predetermined OSI layer of a wireless communication system and intended to transmit signaling information specific of said OSI layer. The method comprises:
  ascertaining the presence of unallotted space in the signaling message, wherein said ascertaining includes ascertaining that the unalloted space includes data different from said signaling information; and
  based on said ascertaining, extracting said data from the unalloted space.

According to still another aspect of the present invention, an apparatus of a wireless communication system is provided, comprising:
  an unalloted space ascertaining unit adapted to ascertain the presence of unallotted space in a signaling message to be transmitted related to a predetermined OSI layer of the wireless communication system, said signaling message being intended to transmit signaling information specific of said OSI layer; and an unallotted space filler unit adapted to at least partly filling the unallotted space with data different from said signaling information.

According to still a further aspect of the present invention, user equipment for use in a wireless communication system is provided, comprising:

a unit adapted to ascertain the presence of data in the unallotted space in a received signaling message related to a predetermined OSI layer of the wireless communication system, said signaling message carrying signaling information specific of said OSI layer; and a data extractor unit adapted to extract said data from the unallotted space.

BRIEF DESCRIPTION OF THE DRAWINGS

The features and advantages of the present invention will be readily understood by reading the following detailed description of an embodiment thereof, provided merely by way of non-limitative example, description that will be conducted making reference to the annexed drawings, wherein.

DETAILED DESCRIPTION OF THE PREFERRED EMBODIMENTS

Figure 1:
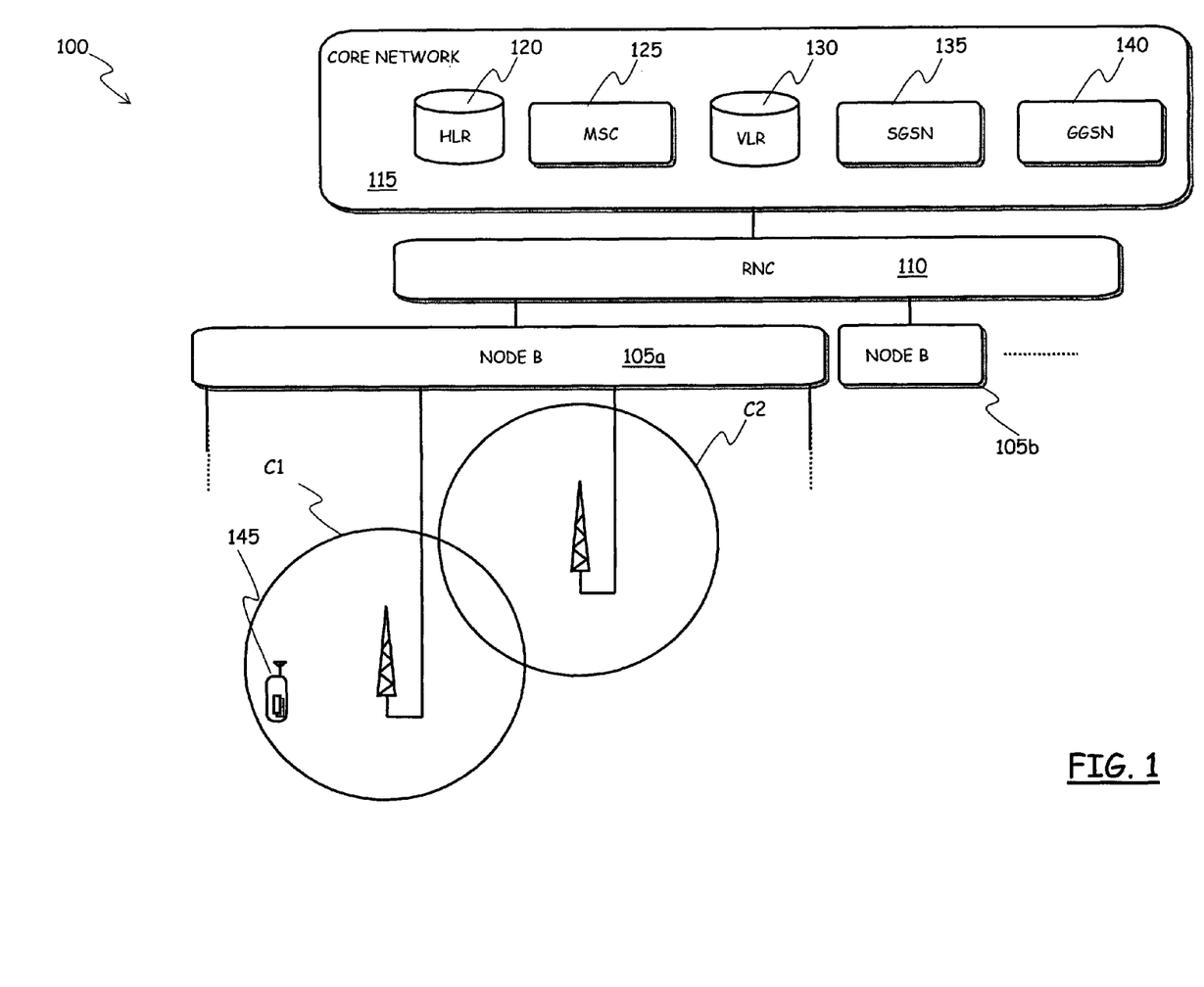
FIG. 1 schematically shows a wireless communication network in which the present invention is exploited, particularly a UMTS network.

Referring to the drawings, in FIG. 1 there is schematically depicted a portion of a UMTS network under planning, the network portion being intended to provide cellular mobile communications capability within a given geographic area.

The UMTS network portion under consideration, identified globally by reference numeral 100, comprises a plurality of cells, only two of which are for simplicity sketched as circles, being identified as C1 and C2; each cell has a respective area coverage (the area of the circles). A cell represents the geographic area covered and served by the radio electromagnetic signal irradiated by a respective cell's BRS, schematized in the drawing as an antenna.

Usually, groups of three to six cells (on average) are managed by a network node called "Node B", such as the Node Bs 105a and 105b in the drawing, wherein, merely by way of example, it is assumed that the cells C1 and C2 are managed by the Node B 105a.

Groups of Node Bs are in turn managed by a network node called "Radio Network Controller" (RNC), like the RNC 110 shown in the drawing.

The antennas, the Node Bs, the RNCs form the radio access portion, i.e. the so-called UTRAN (UMTS Terrestrial Radio Access Network) of the overall network 100.

The RNCs are connected to the core UMTS network, schematically depicted as a block labeled 115 and including a Home Location Register (HLR) 120, several Mobile Switching Centers (MSCs) 125, distributed across the territory, several Visitor Location Registers (VLRs) 130 associated therewith. The generic MSC 125 performs the function of switching to other MSCs 125 of the same network 100, and/or to MSCs of other mobile communications networks, of different network operators (for example, to allow users subscribers of the network 100 to roam in the other mobile communications networks), and/or to the exchanges of one or more wired, Public Switched Telephone Networks (PSTNs). The generic MSC 125 interacts with the HLR 120, and with one of the VLR 130. The HLR 120 contains subscription data of users that are subscriber of that mobile communications network, particularly mobile phone numbers, users' profiles, and the like. The generic VLR 130 contains instead information about the users (either subscribers of that mobile communications network, or subscribers of other mobile communications network) who, at a current time, are registered to the network 100 and are located in the geographic area controlled by the respective MSC 125. Based on the information stored in the HLR 120 and VLR 130, the generic MSC 125 is capable of switching, i.e., properly routing calls from callers to called users.

The UMTS network 100 may further include a packet-switched network portion, particularly based on the GPRS standard, including several Serving GPRS Support Nodes (SGSNs) 135, and one or more Gateway GPRS Support Node (GGSN) 140. The generic SGSN 135 is associated with one or more respective RNCs 110, and routes the data received, through the GGSN 140 (or one of the GGSNs, if more than one GGSN 140 exist) and a GPRS backbone network, from an external packet-based communications network, like the Internet, to the proper destination user equipments, e.g. mobile communication terminals, located in the geographic area covered by the respective RNC 110, like the user equipment 145 depicted as being in the cell C1.

Figure 2A:
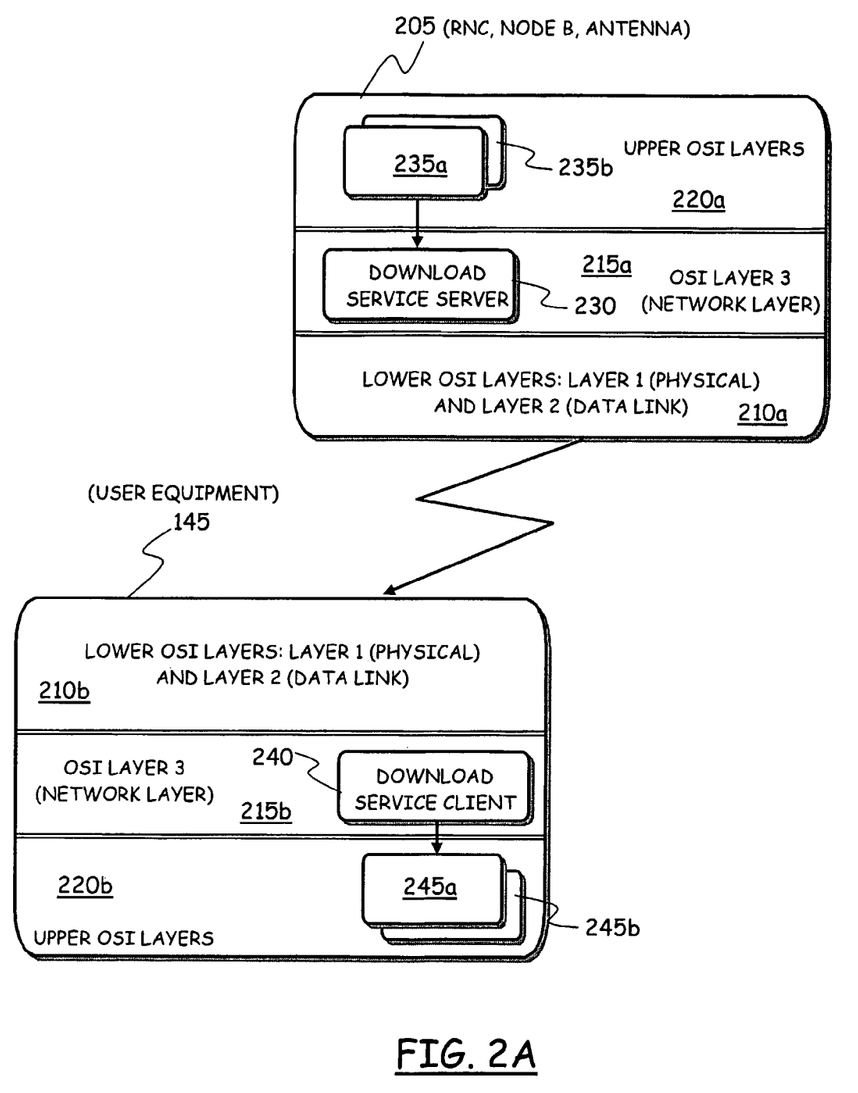
FIG. 2A schematically shows, in terms of functional blocks, a structure of a network layer managing unit of the network and of a user equipment adapted to be used in the wireless communication network, in an embodiment of the present invention.

In FIG. 2A the radio access portion of the network 100, schematized as a block 205, and the generic user equipment 145 are schematically depicted by adopting the ISO OSI model. As known in the art, the OSI model defines a plurality of seven stacked functional levels or layers, namely (from the lowermost to the uppermost): the physical layer (layer 1), the data link layer (layer 2), the network layer (layer 3), the transport layer (layer 4), the session layer (layer 5), the presentation layer (layer 6) and the application layer (layer 7). Each intermediate layer communicates with the layer immediately below, and with the layer above. The operations that are specific of a generic OSI layer (i.e., the interactions among functional entities belonging to that level) are carried out exploiting a specific set of protocols; in order for two functional units of a same OSI layer but belonging to different system to cooperate, a connection needs to be established at the immediately lower layer, using the protocol specific of that lower layer.

In the drawing, as far as the radio access network portion (i.e., the UTRAN) 205 is concerned, the first two layers 1 and 2 thereof are schematized as a single block denoted 210a, the layer 3 is schematized as a block denoted 215a, and the remaining, upper layers 4 to 7 are again schematized as a single block denoted 220a. Similarly, concerning the user equipment 145, the first two layers 1 and 2 thereof are schematized as a single block denoted 210b, the layer 3 is schematized as a block denoted 215b, and the remaining, upper layers 4 to 7 are again schematized as a single block denoted 220b.

Without entering into excessive details, per-se known to those skilled in the art, the physical OSI layer manages the low-level details of the communication, and is thus specific of the type of communication medium used.

The data link layer splits data to be transmitted into fragments suitable for being handled by the physical layer and, in reception, properly combines the fragments to reconstruct the data. In particular, in packet-switched communication systems, the data link layer comprises an RLC (Radio Link Control) sub-layer and a MAC (Media Access Control) sub-layer.

The network layer determines the routing of packets of data from a sender system (like for example the radio access network portion 205) to a receiver (like the user equipment 145) via the data link layer, and is used by the transport layer. In essence, the network layer is responsible for end-to-end (source to destination) packet delivery, whereas the data link layer is responsible for node to node (hop-to-hop) packet delivery. The network layer provides the functional and procedural means of transferring variable length data sequences from a source to a destination via one or more networks while maintaining the quality of service requested by the Transport layer. The Network layer performs network routing, flow control, network segmentation/de-segmentation, and error control functions.

The transport layer provides transparent transfer of data between hosts; in particular, it is responsible for end-to-end error recovery and flow control, and ensuring complete data transfer.

The session layer provides the mechanism for managing the dialogue between end-user application processes.

The presentation layer is responsible for the formatting and delivery of information to the application layer for further processing or display; it relieves the application layer of concern regarding syntactical differences in data representation within the end-user systems.

Finally, the application layer is the layer at which the applications for performing specific tasks runs.

In a UMTS network, the network layer, also referred to as the Radio Resource Control (RRC) layer, is typically located in the RNCs 110; an RRC layer is further implemented in any user equipment 145 as well. In a GSM/GPRS network, the network layer is also referred to as the Radio Resource management (RR) layer.

Generally speaking, in a wireless communication system like a UMTS network, communication protocols are grouped into a transmission plane and a control plane. The transmission plane groups the protocols used for the transfer of the payload, whereas the control plane groups the protocols used for control signaling.

The control-plane signaling can in principle be divided in system signaling, i.e. signaling that is not user-specific and is instead common to all the user equipments, and user signaling, specific to a generic user equipment.

In particular, as far as the radio access to the network is concerned, the signaling messaging towards/from the user equipments is managed by the network layer.

The network-layer signaling messages are used by the network for transmitting system information and user information. System information include in particular information necessary to the generic user equipment for correctly accessing the network: they may for example include instructions and/or parameters for synchronizing in time the wireless communication system (i.e. the network and the user equipments), for properly tuning the user equipment, for defining the access policy of a generic user equipment when it accesses the network (for example, for defining the transmission power level of the user equipment), geographic information (for example, an identifier—Cell Identity or CI—of the cell wherein the user equipment is located, the list of adjacent cells, the so-called Location Area Code or LAC and the like). System information signaling messages are only sent in downlink, from the network to the user equipments. User information signaling messages, which are more than the system information signaling messages and, differently therefrom, are exchanged both in downlink and in uplink, from the user equipments to the network, relate to the set-up, management and release of a link with a specific user equipment, as well as information for managing the mobility of the user equipment, like for example (in uplink) information reporting the quality at which the signal from the network equipment is received.

The network layer signaling of the UMTS standard are described in great detail in the 3GPP Technical Specifications TS 25.331, entitled "Radio Resource Control (RRC) protocol specification"; the 3GPP Technical Specification TS 04.18, entitled "Mobile radio interface layer 3 specification; Radio Resource Control (RRC) protocol", describes in detail the signaling protocol for GSM/GPRS networks. Both these documents can be found (at the date of filing of the present application) on the Web site http://www.3gpp.org/specs/numbering.htm, and are incorporated herein by reference.

According to an embodiment of the present invention, a download service server 230 is implemented at the RRC layer, i.e. at the network layer 215a of the network 100. The download service server 230 provides services to one or more modules 235a, 235b of the upper OSI layers 220a, such as for example one or more application modules in the application OSI layer (for example, just to cite a few examples, software update distribution modules for distributing to the user equipments updated software releases, modules for providing traffic or weather information, lists and locations of hotels, restaurants, cinemas, theaters, and other similar cell-specific data). In particular, the download service server 230 receives from the modules 235a, 235b data to be transmitted to user equipments. The download service server 230 is structured to transmit the data exploiting the RRC layer, i.e. the layer 3 system information signaling messages of the network.

Similarly, according to an embodiment of the present invention, user equipments like the user equipment 145 may implement a download service client 240 at the RRC layer 215b. The download service client 240 provides services to one or more modules 245a, 245b of the upper OSI layers 220b, such as for example one or more application modules in the application OSI layer (referring to the above example, modules for receiving and deploying software updates, modules for receiving and displaying traffic or weather information, or listings of hotels, restaurants, and the like). In particular, the download service client 240 is structured to extract, from RRC layer system information signaling messages issued by the network, data transmitted by the download service server 230, and to pass the extracted data to the upper layer modules 245a, 245b.

In particular, according to an embodiment of the present invention, the download service server 230 and the download service client 240 are structured to exchange data exploiting available, residual unallotted space in the RRC layer system information signaling messages that, as prescribed by the standard, the network sends in downlink to the user equipments.

In the network layer protocol of the UMTS network, according to the above cited technical specification, a system information signaling message referred to as the SYSTEM INFORMATION message is defined: the SYSTEM INFORMATION message is used for transporting the system information of the generic network cell.

As prescribed by the UMTS standard, the system information elements are broadcast in system information blocks. A generic system information block groups together system information elements of the same nature. Different system information blocks may have different characteristics, e.g. regarding their repetition rate and the requirements on the user equipments to re-read the system information blocks.

The system information is organized as a tree: a Master Information Block (MIB) gives references and scheduling information to a number of System Information Blocks (SIBs) in a network cell; the SIBs contain the actual system information. The MIB may optionally also contain reference and scheduling information to one or two scheduling blocks, which give references and scheduling information for additional SIBs. Scheduling information for a SIB may only be included in either the MIB or one of the scheduling blocks. In other words, the MIB is an index of the various information elements making up the system information, and provides for example information about the supported Public Land Mobile Networks (PLMNs) and the scheduling of the SIBs; each SIB relates to a respective group of parameters, and includes values thereof to be communicated to the user equipments for their proper functioning; for example, these parameters include parameters for the user equipment when operating in idle mode, and parameters for the user equipment when operating in connected mode. The standard defines eighteen different types of SIBs that the network can send to the user equipments, each SIB in respect of a specific information content. The MIB, the scheduling blocks (where present) and the SIBs are transmitted in encoded form, particularly according to the Abstract Syntax Notation (ASN.1) encoding.

A generic SYSTEM INFORMATION message is used to convey the system information blocks (MIB, scheduling blocks, SIBs) on a BCCH (Broadcast Control CHannel), which is one of the logic channels defined in the standard; a given BCCH may be mapped onto either a BCH (Broadcast CHannel) or a FACH (Forward Access CHannel), which are two of the transport channels defined in the standard:

The size of the SYSTEM INFORMATION message shall thus fit the size of a BCH or a FACH transport block. To this purpose, the UTRAN 205 needs to create RRC Protocol Data Units (RRC-PDUs), wherein the generic RRC-PDU is the elementary information unit of the RRC protocol, which is passed by the RRC layer down to the lower OSI layers for transmission to the user equipments. The RRC-PDUs have a predetermined, fixed length in bits, equal to the size of a generic BCH/FACH transport-block; for example, the Technical Report 34.108 "Common test environments for User Equipment (UE) conformance testing, Release 99", downloadable (at the date of filing of the present application) from the site www.3gpp.org, suggests a length ("payload size") of 166 bits. The system information blocks that compose the generic system information signaling message have instead a variable length, so a splitting ("segmentation") and concatenation of pieces of different system information blocks may be necessary; in particular, a system information block having a length such that the length of the resulting SYSTEM INFORMATION message does not fit the RRC-PDU size has to be fragmented into two or more fragments, each one of length sufficiently lower than the RRC-PDU length; differently, two or more short system information blocks, or fragments thereof, may have to be concatenated and put into a same SYSTEM INFORMATION message, so as to approximate the length of the RRC-PDU.

The RRC layer 215*a* in the UTRAN 205 performs the above-mentioned segmentation and concatenation of encoded system information blocks (i.e., encoded MIB, scheduling blocks and SIBs). If the encoded system information block is larger than the size of a SYSTEM INFORMATION message, it is split into two or more segments and transmitted in two or more SYSTEM INFORMATION messages. If the encoded system information block is smaller than a SYSTEM INFORMATION message, the UTRAN 205 may concatenate two or more system information blocks, or the first segment or the last segment into a same SYSTEM INFORMATION message.

In particular, four different segment types are defined: first segment; subsequent segment; last segment; and complete. Each of the types first segment, subsequent segment and last segment is used to transfer segments of a MIB, a scheduling block or a SIB. The segment type complete segment is used to transfer a complete MIB, a complete scheduling block or a complete SIB.

In general, each segment consists of a header and a data field. The data field carries the encoded system information elements. The header contains the number of segments in the SIB (if the segment is of the first segment type); SIB type (a parameter that uniquely identifies the master information block, scheduling block or a system information block); a segment index (if the segment type is of the subsequent segment or Last segment type).

The UTRAN 205 may combine one or several segments of variable length in the same SYSTEM INFORMATION message.

In greater detail, as far as system information blocks (MIB, scheduling blocks, SIBs) are concerned, building of an RRC-PDU involves two stages.

The first stage is the building of the system information blocks (MIB, scheduling blocks, SIBs); the information is encoded, for example by means of an ASN.1 encoding; in this stage, the standard allows for the attachment of an extension field at the end, useful for carrying additional information, but, differently from other RRC signaling messages, no padding is performed at this stage in respect of the system information elements.

The second stage is the building of the RRC-PDUs: in this stage, segmentation and concatenation of system information blocks (MIBs, scheduling blocks, SIBs) is performed. Then, an ASN.1 encoding is performed again over the concatenated segments, and then padding is performed, to add padding information at the end of the RRC-PDU so as to reach the prescribed length.

Figure 2B:
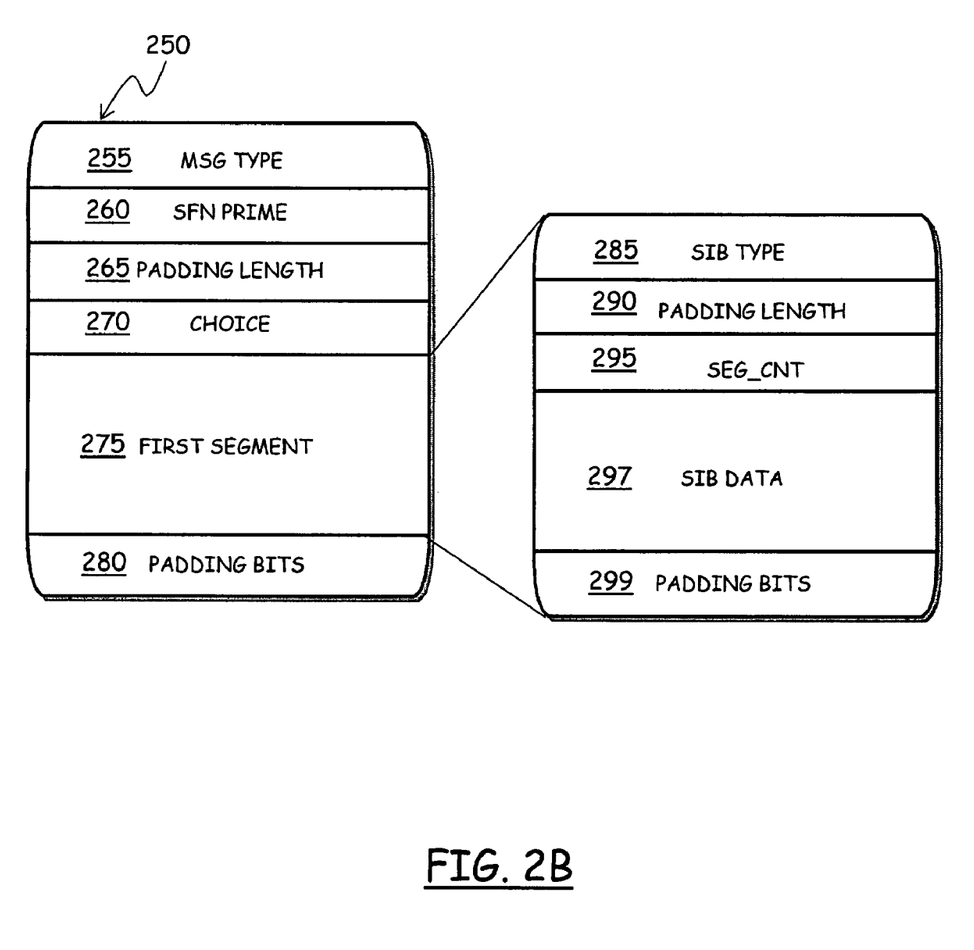
FIG. 2B schematically shows the structure of a network-layer SYSTEM INFORMATION signaling message, modified according to an embodiment of the present invention.

Referring to FIG. 2B, a SYSTEM INFORMATION message allowed by the standard is schematically shown, being depicted as a whole by 250. In particular, the SYSTEM INFORMATION message 250 is a message including a first segment of a system information block, e.g. the first segment of a SIB. The message 250 starts with a "MSG TYPE" (message type) field 255, followed by a field "SFN PRIME" 260 (the meaning of which being not relevant to the present description), a field "CHOICE" 270, whose value is indicative of the combination of first/subsequent/last/complete segments included in the message 250, in the example herein considered the combination "2", corresponding to a first segment. The message 250 ends with a number of padding bits 280, necessary to reach the prescribed message length.

Also schematically shown in FIG. 2B is the structure of the "first segment" 275: a field "SIB TYPE" 285 specifies the type of the SIB; a field "SEG_CNT" 290 is a counter specifying the number of the segment being transmitted; the portion of system information corresponding to the segment being transmitted are included in a data field "SIB DATA" 297. Further, optional fields 290 and 299 may be present in "first segment" 275, as discussed further on.

The RRC layer 215b of the generic user equipment 145 is capable of reconstructing a system information signaling message from the fragments transported by the received SYSTEM INFORMATION messages.

According to an embodiment of the present invention, the RRC layer 215a of the UTRAN 205 is adapted to detect and exploit the unallotted part of the SYSTEM INFORMATION messages, represented by the padding bits 280, for transmitting data (i.e., information different from the network-layer signalling information), and, in order to enable the user equipments to understand the presence of data in the padding bit message portion, to insert, in the SYSTEM INFORMATION message an optional, additional field, hereinafter referred to as "PADDING LENGTH", adapted to specify a value being for example an integer indicative of the number of padding bits included in the generic SYSTEM INFORMATION message. For example, referring to FIG. 2B, the PADDING LENGTH field 265 may be inserted after the field SFN PRIME 260, before the field CHOICE 270.

Figure 3:
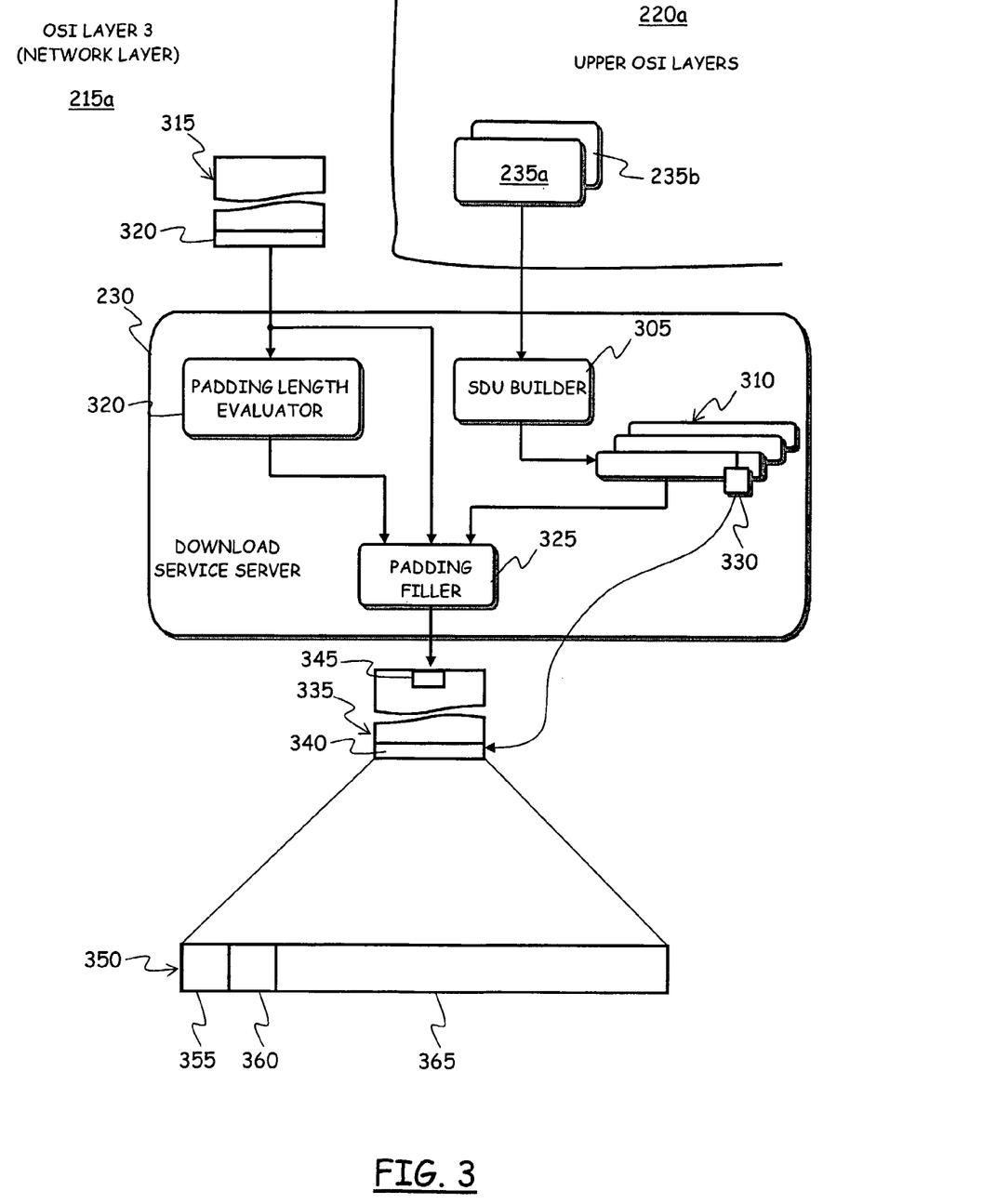
FIG. 3 schematically shows, again in terms of functional blocks, the structure of a download service server of the network layer managing unit of the network, in an embodiment of the present invention.

In FIG. 3 there is schematically shown, in terms of the main functional units, the structure of the download service server 230, in an embodiment of the present invention.

The download service server 230 is adapted to receive from the modules 235a, 235b it serves, located at the upper OSI layers (e.g. at the application layer), data to be transmitted to the user equipments; for example, as mentioned in the foregoing, the upper-layer modules may include a software download server application module, adapted to manage the download of new or up-to-date software to the user equipments. The data are received by a buffer 305, of suitable size, and adapted to arrange the data received from the different upper-layer modules into several Service Data Units (SDUs), denoted as a whole as 310, each SDU including data that are homogeneous with each other (for example, data received from a same upper-layer module, and/or relating to a same information content, for example, traffic data, weather data, pieces of a software update being downloaded, and the like). In other words, the SDUs are queues, wherein homogeneous data received from the upper-layer modules are temporarily stored until they are transmitted.

The download service server 230 is adapted to intercept a SYSTEM INFORMATION message 315 prepared by the RRC layer 215a of the UTRAN 205 according to the standard, as briefly outlined in the foregoing. The intercepted SYSTEM INFORMATION message 315, possibly including padding bits schematically denoted as a whole as 320, is analyzed by a padding length evaluator module 325, adapted to detect the number of padding bits 320 in the message 315.

Based on the analysis of the padding length evaluator module 325, a padding filler module 325 is adapted to take, from a selected one of the SDUs 310 in the buffer 305 an amount of data 330 corresponding to the evaluated padding length in the message 315, and to put that amount of data 330 into a part 340 of the message 315 originally occupied by the padding bits 320, thereby creating a modified SYSTEM INFORMATION message 335. The padding filler module 325 is further adapted to introduce in the modified SYSTEM INFORMATION message 335 the above-mentioned additional field PADDING LENGTH (in FIG. 3 denoted as 345), carrying a value indicative of the amount of data 330 put in the padding bit(s) place of the modified SYSTEM INFORMATION message 335.

In particular, in an embodiment of the present invention, the (padding filler 325 of the) download service server 230 is adapted to encapsulate the data received from the upper-layer modules and to be transmitted to the user equipments within one or more data fragments, hereinafter referred to as "segments" 350. The generic segment 350 includes for example three fields 355, 360 and 365, namely a "first segment" field 355, a "last segment" field 360, and a "data" field 365. The first segment field 355 is for example a one-bit field whose value ("1" or "0") is used to indicate whether the current segment is the first segment of the data being transmitted (in this case the value of the first segment field is equal to "1", otherwise it is equal to "0"). The last segment field 360 is similarly a one-bit whose value is used to indicate whether the current segment is the last segment of the data being transmitted (in this case the value of the first segment field is equal to "1", otherwise it is equal to "0"). The data field 365 has a variable size, equal to the number of available padding bits in the SYSTEM INFORMATION message (as determined by the padding length evaluator 320), minus two (the number of bits occupied by the first segment and last segment fields).

Figure 4:
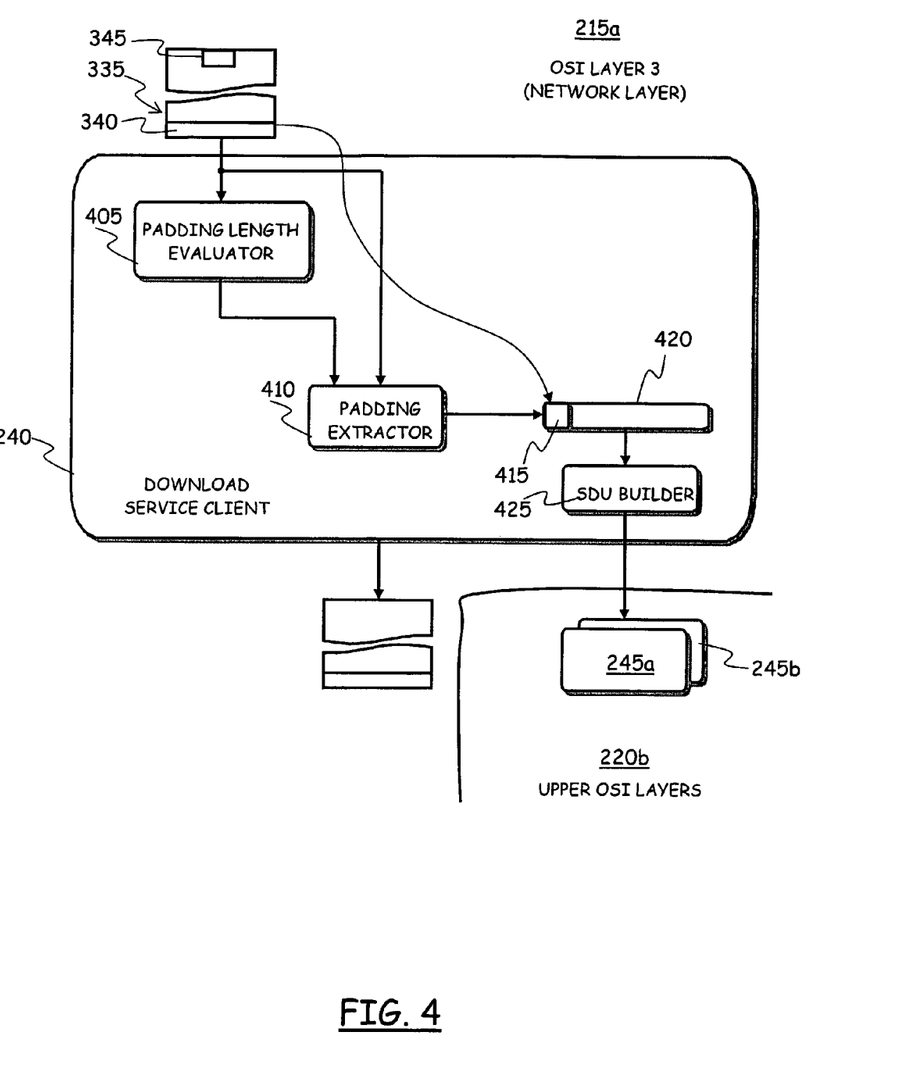
FIG. 4 schematically shows, still in terms of functional blocks, the structure of a download service client of the network layer managing unit of the user equipment, in an embodiment of the present invention.

In FIG. 4 there is schematically shown, in terms of the main functional units, the structure of the download service server 230, in an embodiment of the present invention.

A generic SYSTEM INFORMATION message, like the modified SYSTEM INFORMATION message 335, when received at the RRC layer 215b of the generic user equipment 145, is intercepted by the download service client 240. The message is passed to a padding length evaluator module 405 which is adapted to check the message for the presence of the additional field PADDING LENGTH 345, and, if encountered, to determine the length of the padding in the message based on the value of such a field 345. Based on the result of the check performed by the padding length evaluator module 405, a padding extractor module 410 extracts from the received message 335 the data transported in the space 340 dedicated to the padding bits, and puts the extracted data 415 into a receive buffer 420, wherein the data, fragmented by the download service server 230 for transmission, are queued as they are received; the padding extractor module exploits the information contained in the field Padding Length 345, and of the first segment and last segment field accompanying the data being transmitted, for properly reconstructing the data. From the receive buffer 420, an SDU builder 425 builds an SDU from the data queued in the receive buffer 420, and passes the SDU to the upper-layer modules 245a, 245b (for example, to a software download client application).

In the following, a method according to an embodiment of the present invention will be described, with the help of the activity flow charts of FIGS. 5 and 6. In particular, FIG. 5 relates to the operation of the download service server 230 in the UTRAN 205, whereas FIG. 6 relates to the operation of the download service client 240 in the generic user equipment 145.

Figure 5:
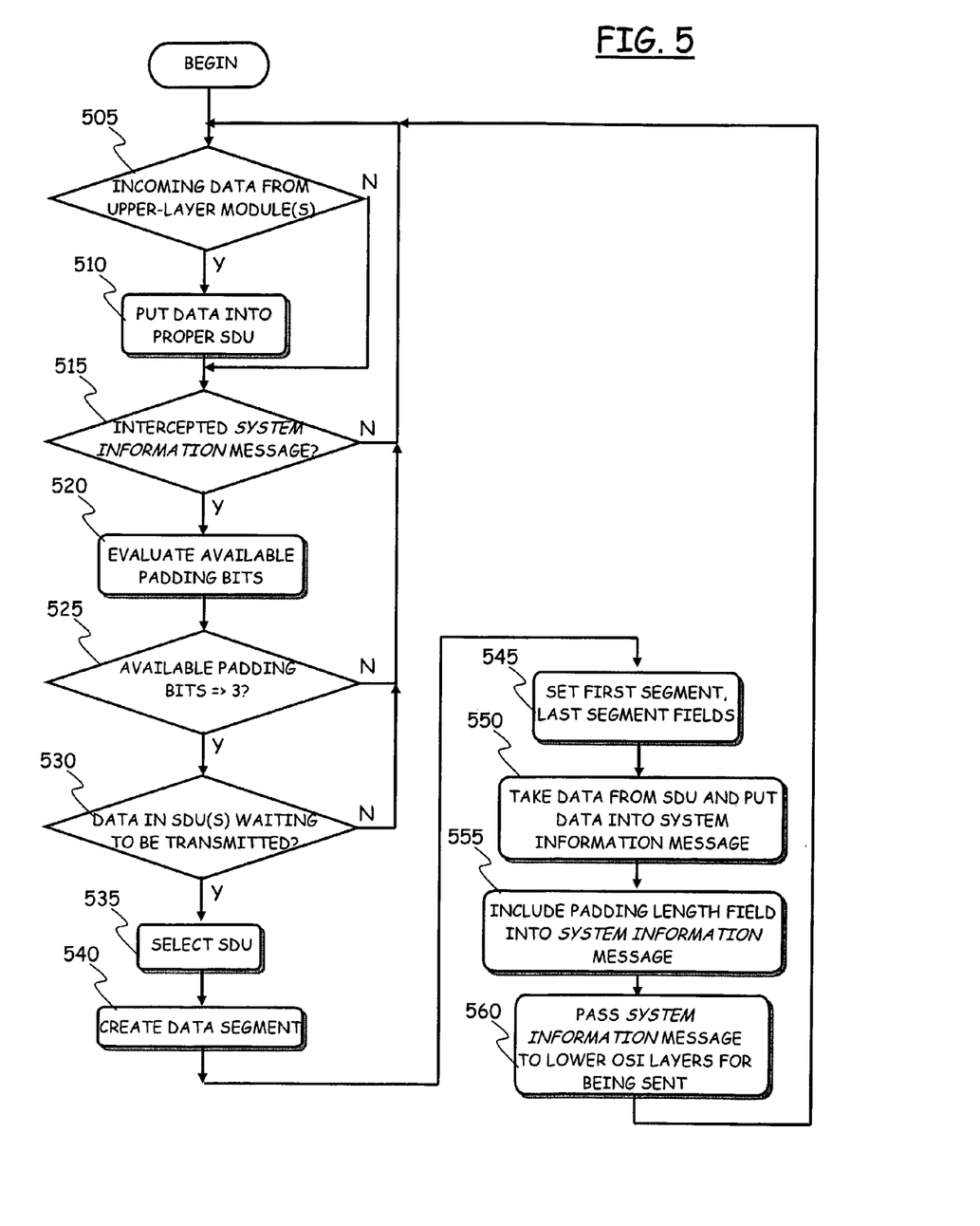
FIG. 5 schematically shows, in terms of an operation flow chart, the main steps of a method performed by the download service server, in an embodiment of the present invention.

Let the download service server 230 in the UTRAN 205 be considered first (FIG. 5). The download service server 230 repeatedly checks for the presence of incoming data sent by the upper-layer modules 235a, 235b, for example from a software download server application, or modules adapted to provide cell-specific data like traffic or weather information, lists of hotels, restaurants, and the like (decision block 505). If the download service server 230 detects the presence of incoming data (exit branch Y of decision block 505), it takes the incoming data and puts them in the buffer 310, in a proper SDU (i.e., in an already existing SDU, queued to already received data, if the data are homogeneous (i.e., of the same nature, e.g. because they are issued by the same upper-layer module) with the data already received, or in a new SDU if the received data are not homogeneous with other data) (block 510).

The download service server 230 then checks whether the RRC layer 215a of the UTRAN 205 has generated a SYSTEM INFORMATION message (decision block 515). In the negative case (exit branch N of decision block 515), the operation flow jumps back to the beginning (i.e., back to the decision block 505).

In the affirmative case (exit branch Y of decision block 515), the download service server 230 evaluates the number of available padding bits (if any) in the intercepted SYSTEM INFORMATION message (block 520).

The download service server 230 then ascertains whether the number of available padding bits in the intercepted SYSTEM INFORMATION message is at least equal to a minimum prescribed number, in the present example three bits (decision block 525); in particular, in the exemplary embodiment herein described, the minimum number of three available padding bits derives from the fact that based on the structure of the generic elementary segment of data that the download service server 230 can put in the SYSTEM INFORMATION message, in order to transmit at least one bit of data three bits are required: one bit for the first segment field, another bit for the last segment field, and at least one bit of data in the data field. This is however not to be construed as a limitation of the present invention.

In the negative case (exit branch N of decision block 525), the operation flow jumps back to the beginning (decision block 505).

In the affirmative case (exit branch Y of decision block 525), the download service server 230 checks whether there are data in the buffer 310 waiting to be transmitted (decision block 530). In the negative case (exit branch N of decision block 530), the operation flow jumps back to the beginning (decision block 505). In the affirmative case (exit branch Y of decision block 530), the download service server 230 selects in the buffer 310 the proper SDU containing the data to be transmitted (block 535).

The download service server 230 then creates the data segment to be embedded in the SYSTEM INFORMATION message to be sent (block 540).

In greater detail (block 545), the download service server 230 checks whether the data of the segment being created pertains to a new SDU, i.e. to an SDU of which no data have yet been transmitted: in the affirmative case, the first segment field of the segment being created is set to "1", otherwise (i.e., if the data of the segment being created pertains to an SDU part of the data of which have already been transmitted, the first segment field is set to "0"). Furthermore, the download service server 230 also checks whether, by the data that are to be included in the segment being created, the transmission of the data of an SDU is completed: in the affirmative case (i.e., if the number of available padding bits less two is greater or equal to the remaining number of data bits in the selected SDU) the last segment field is set to "1", otherwise (i.e., if, after the transmission of the data segment being created, data of the SDU remain to be transmitted), the last segment field is set to "0".

The download service server then takes from the selected SDU a number of bits equal to the number of available padding bits, less two (or, if the selected SDU contains less bits, all the remaining SDU bits), and puts the data into the data field of the data segment (block 550).

Finally, the download service server 230 inserts into the SYSTEM INFORMATION message the Padding Length field, putting the value thereof equal to the size, for example in bits, of the data segment previously created and embedded in the space of the message originally occupied by the padding bits.

The SYSTEM INFORMATION message, thus modified, is then caused to be transmitted, as a usual RRC layer message (block 555).

Figure 6:
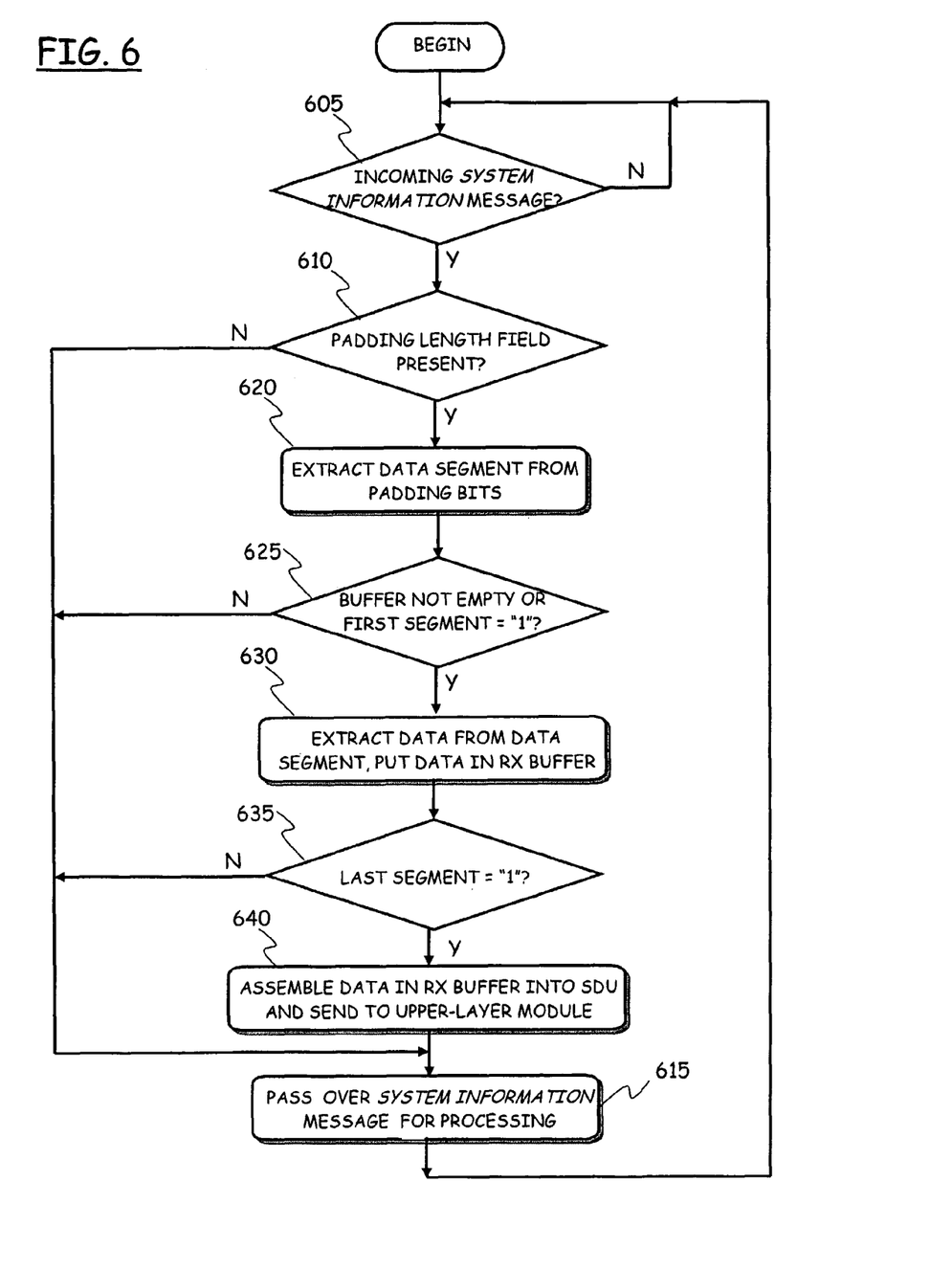
FIG. 6 schematically shows, in terms of an operation flow chart, the main steps of a method performed by the download service client, in an embodiment of the present invention.

Making now reference to FIG. 6, the download service client 240 in the generic user equipment 145 checks for incoming SYSTEM INFORMATION messages from the UTRAN (decision block 605).

When a SYSTEM INFORMATION message is received (exit branch Y of decision block 605), the download service client 240 checks whether the field PADDING LENGTH 345 is present in the received message (decision block 610). In the negative case (exit branch N of decision block 605), the SYSTEM INFORMATION message is passed over for being processed (block 615), otherwise (exit branch Y of decision block 610), the data segment embedded in the SYSTEM INFORMATION message (determined based on the value of the PADDING LENGTH field 345) is extracted (block 620).

The download service client 240 then checks whether the receive buffer 420 is not empty, or whether the first segment field in the extracted data segment is set to "1" (decision block 625): if either one of these two conditions is verified (exit branch Y of decision block 625), the data included in the data field of the extracted data segment are put into the receive buffer 420 (block 630), otherwise they are discarded (if the receive buffer is ascertained to be empty, but the first segment field in the received data segment is not set to "1", something wrong must have occurred, and one or more data segment may have been lost; the data just received are thus preferably discarded, to avoid that the reconstructed data are corrupted).

Then, the download service server checks whether the last segment field in the extracted data segment is set to "1" (decision block 635): in the affirmative case (exit branch Y of decision block 635), the data present in the receive buffer 420 are assembled into one SDU, which is then passed up to the proper upper-layer module (block 640).

It can be appreciated that, thanks to the present invention, the transmission capabilities of the wireless network 100 are enhanced, just by exploiting the network resources more efficiently, i.e. by using the otherwise wasted padding information that is often added to signalling information messages for complying with length prescriptions. The impact on the network structure is minimal, and slight adjustments to the network management software, particularly in respect of the network OSI layer is sufficient. The increased transmission capabilities may expediently be used for transmitting data concerning traffic, weather, hotels, restaurants, and so on; in particular, being the network-layer signalling specific for each network cell, cell-specific data can be broadcasted to the user equipments within the cells.

In the foregoing it has been assumed to exploit the padding bits that may be present at the end of a SYSTEM INFORMATION message for reaching the predetermined length. Referring back to FIG. 2B, it is observed that, still according to the 3GPP Technical Specifications TS 25.331, padding information may also be added at the end of the data field 297 of segments of the type "SIB data fixed"; data fixed segments may be either last segments or complete segments. A SIB data fixed segment has a fixed length (i.e., no length denominator is used). In case the SIB DATA field 297 is not filled by the system information block segment, the RRC layer includes padding bits 299. Since no length denominator is included, the RRC layer of the receiver user equipment cannot remove the padding bits added by the sender.

According to an alternative embodiment, instead of using the padding bits 280 at the end of the message, or in addition thereto, the padding bits 299 possibly present at the end of the SIB DATA field 297 of a generic SIB data fixed segment included in the SYSTEM INFORMATION message are exploited, in a way that can be totally similar to that described in the foregoing; to this purpose, the UTRAN 205 includes in the SYSTEM INFORMATION message, particularly in the proper segment(s), a field "PADDING LENGTH" 290 (for example, after the field SIB TYPE 285), adapted to enable the user equipments to detect the presence and amount of padding bits exploited for transmitting data.

In the following, an estimation of the amount of data that can be transmitted exploiting the above described mechanism is provided. Referring for example to the already cited Technical Report 34.108, the logic channel BCCH that transports the system signalling information has the characteristics reported in the following table:

TABLE 1

| BCCH characteristics | | |
|---|---|---|
| Higher layer RLC | RAB/signalling RB | SRB |
| | User of Radio Bearer | RRC |
| | Logical channel type | BCCH |
| | RLC mode | TM |
| | Payload sizes, bit | 166 |
| | Max data rate, bps | 16600 |
| | AMD/UMD/TrD PDU header, bit | 0 |
| MAC | TTI | 10 ms |

The RLC layer operates in transparent mode, i.e. it does not add any control information to the information it receives, and passes it to the lower (MAC) OSI layer. The length of an RLC-PDU is, as mentioned above, 166 bits.

In order to evaluate the bit-rate obtainable exploiting the padding bits as described above, the table below reports the typical sizes of the different possible SIBs usually included in the system signalling information, together with the repetition rates (parameter SIB_REP) of each SIB in frames (as known to those skilled in the art, a UMTS frame denotes a time interval of 10 ms, corresponding to 15 time slots, and is used as a basis for calculating the transmission/repetition times of the information.

TABLE 2

| SIB typical sizes | | | | | | | |
|---|---|---|---|---|---|---|---|
| | Block Type | | | | | | |
| | MIB | SIB1 | SIB3 | SIB5 | SIB7 | SIB11 | SIB12 |
| Dimensione (bytes) | 22 | 16 | 11 | 67 | 3 | 165 | 8 |
| SIB_REP | 8 | 32 | 32 | 32 | 64 | 128 | 64 |

Under the assumption of using the BCCH described in Table 1, and the SIBs described in Table 2, taking into account the number of repetitions of each SIB and considering a time interval equal to the maximum value of the parameter SIB_REP (indicating the number of frames between repetitions of the respective SIB), (i.e. 128 for the SIB "SIB11"), the following values are obtained, giving the total number of bytes occupied by the system information.

TABLE 3

| Total SIB occupation | | | | | | | | |
|---|---|---|---|---|---|---|---|---|
| | Block Type | | | | | | | |
| | MIB | SIB1 | SIB3 | SIB5 | SIB7 | SIB11 | SIB12 | TOTAL |
| Size (bytes) | 22 | 16 | 11 | 67 | 3 | 165 | 8 | |
| Number of repetitions per period | 16 | 4 | 4 | 4 | 2 | 1 | 2 | |
| Total occupation (bytes) | 352 | 64 | 44 | 268 | 6 | 165 | 16 | 915 |

Based on the values reported in Table 3, in an overall time interval T of 128 UMTS frames, equal to 1280 ms, a total of $B_{req}$=915 bytes are requested, compared to an availability $B_{offer}$ of 2656 bytes. Assuming for simplicity that the segmentation of the SIBs and the coding of the SYSTEM INFORMATION messages at the RRC level are ideal, i.e. without overhead, a residual bit rate $R_{avail}$ is obtained equal to:

$$B_{avail} = B_{offer} - B_{req} = 2656 - 915 = 1741 \text{ byte}$$

$$\rightarrow R_{avail} = \frac{B_{avail}}{T} = \frac{1741}{1.28} = 1360 \text{ byte/s}$$

The non-ideal nature of the SIB segmentation and of the coding impacts the available bit rate; a precautionary estimation of the non-idealities suggest to reduce for example of about 30% the residual bit rate. Thus, a useful bit rate of approximately 8 Kbit/s is reasonably achievable.

It is however pointed that that the above estimation is based on the assumption of a specific structure of the system information. Since the size of the system information depends on the specific information, as well as on the scheduling chosen by the network operator, the number of SIBs, their size, the number of repetitions may vary depending on the considered network cell.

It is pointed out that albeit in the solution described in the foregoing system information signalling messaging has been exploited, nothing prevents from exploiting, either in substitution or in combination, user information signalling messaging: in such a case the transmitted data, instead of being broadcast to every user equipment in the generic cell, are addressed to specific user equipments. It is nevertheless observed that while system information signalling messaging has a guaranteed periodicity, this is not the case for user information signalling messaging, so the useful bit rate might be lower.

It is also pointed out that albeit in the foregoing it has been assumed that the data are only downloaded, from the (UTRAN of the) network to the user equipments, this is not to be intended as a limitation of the present invention: nothing prevents from implementing a data transfer in uplink, from the user equipments to the network, by providing an upload service server in the user equipments, and an upload service client in the UTRAN. A possible way to do this is to exploit signalling messages specific for the uplink, like for example the CELL UPDATE message of the RRC protocol, used by the generic user equipment for communicating to the network the new network cell on which the terminal is presently camped. Mixed solutions are also possible, in which data are both downloaded and uploaded.

It is pointed out that although in the foregoing reference has been made to the use of a signalling message of the network OSI layer, particularly a signalling message of the RRC layer of a UMTS network, and even more particularly the SYSTEM INFORMATION message, this is not to be construed as a limitation of the present invention, which can instead be applied more generally, by suitable modifications and adaptations, irrespectively of the specific type of signalling message, and irrespective of the OSI layer considered. For example, the invention can be applied to GSM/GPRS networks: in this case, a possible embodiment of the invention makes use of the system information signalling messages at the network (RR) layer. Another possibility resides in the use of the paging message, a signalling message used by the GSM/GPRS and UMTS networks for alerting a generic user equipment that there is an incoming call directed thereto. More generally, any signalling message, at any level of the ISO OSI stack, may be expediently exploited as proposed by the present invention, provided the relevant protocol provides for the use of padding or dummy bits for the sole purpose of respecting a predetermined message length.

The applicability of the invention in the context of wireless telephony networks is also not limitative: the present invention can in fact be applied to different wireless communication networks, like for example WiFi networks: just by way of example, the padding bits exploited may be those provided for in the BEACON message As mentioned in the foregoing, a possible use of the method according to the present invention may be the download to the user equipments of pieces of operative software necessary for reconfiguring the user equipment so as to render it able to operate in a new system, or the download of a software update and/or patch of software modules already installed in the user equipment. Other information that may be transferred exploiting the method proposed may include information specific of the geographic area wherein the user is currently located (i.e., the area covered by the network cell wherein the user is located), like traffic information, weather information, suggestions of restaurants, cinemas, theatres.

It is also pointed out that the implementation of the present invention is not limited to the advantage of the users of mobile phones or portable computers. More generally, the present invention may be expediently used in completely different contexts, like for example networks of sensors deployed on the territory for detecting environmental parameters (presence of pollutants, temperature of the air, rainfalls, etc.). The solution proposed may for example be used for configuring the sensor units, or (in uplink) for receiving data therefrom, exploiting a wireless communication network (by equipping the sensors with suitable communication hardware), without wasting precious communication bandwidth. Other useful applications may include receiving data from remote sensors, located on the field, about current traffic conditions in specific areas, or the arrival times of public transportation means, or the like The present invention may further be applied in Digital Video Broadcasting (DVB) systems, both terrestrial (DVB-T) and satellite-based.

The present invention has been disclosed by describing some exemplary embodiments thereof, however those skilled in the art, in order to satisfy contingent needs, will readily devise modifications to the described embodiments, as well as alternative embodiments, without for this reason departing from the protection scope defined in the appended claims.

The invention claimed is:

1. A method of exploiting a signaling message related to a predetermined open system interconnect layer of a wireless communication system and configured to transmit signaling information specific to said open system interconnect layer for transmitting data different from said signaling information, comprising:

ascertaining the presence of unallotted space in said signaling message related to said predetermined open system interconnect layer;

based on the ascertained presence of unallotted space, determining an amount of transmissible data different from said signaling, wherein said transmissible data relates to a second open system interconnect layer different from said predetermined open system interconnect layer; and modifying the signaling message by filling at least part of the unallotted space with said amount of transmissible data.

2. The method according to claim 1, wherein said unallotted space comprises padding bits provided in the signaling message for reaching a predetermined message length.

3. The method according to claim 2, wherein said modifying comprises the step of including in the signaling message an indication of a presence of said amount of transmissible data in the signaling message.

4. The method according to claim 3, wherein said indication of the presence of said amount of transmissible data in the signaling message is configured to specify the amount of transmissible data put in said unallotted space.

5. The method according to claim 4, wherein said signaling message is a message at a network open system interconnect layer.

6. The method according to claim 5, wherein said wireless communication network is a wireless fidelity network, and said signaling message is a beacon message.

7. The method according to claim 5, wherein said wireless communication system is a cellular telephony network, a global system for mobile communication or a universal telecommunication system network, and said signaling message is a radio resource-level or, respectively, a radio resource control-level message.

8. The method according to claim 7, wherein said radio resource control-level message is a system information message.

9. The method according to claim 8, wherein, including the indication of the presence of said amount of transmissible data, comprises:
   defining a custom system information message field; and
   assigning to said custom system information message field a value corresponding to said amount of transmissible data.

10. The method according to claim 9, wherein said filling at least part of the unallotted space with said amount of transmissible data comprises:
   segmenting a data string to be transmitted into a plurality of segments; and
   filling at least part of the unallotted space of the signaling message with at least one of said segments, together with an indication of relative position of the at least one segment within the data string.

11. The method according to claim 1, comprising:
   when receiving the signaling message, extracting the data in the unallotted space therein.

12. The method according to claim 11, wherein said modifying comprises the step of including in the signaling message an indication of a presence of said amount of transmissible data in the signaling message, and further comprising exploiting said indication of the presence of data for ascertaining a presence of data in the unallotted space of the received signaling message.

13. The method according to claim 11, wherein said indication of the presence of said amount of transmissible data in the signalling message is configured to specify the amount of transmissible data put in said unallotted space, and further comprising exploiting said amount of transmissible data put in said unallotted space for determining the amount of data to be extracted from the received signaling message.

14. A method of receiving a signaling message related to a predetermined open system interconnect layer of a wireless communication system and intended to transmit signaling information specific to said open system interconnect layer, comprising:
   ascertaining the presence of unallotted space in the signaling message, wherein said ascertaining comprises ascertaining that the unallotted space comprises data different from said signaling information, wherein said data relates to a second open system interconnect layer different from said predetermined open system interconnect layer; and
   based on said ascertaining, extracting said data from the unallotted space.

15. The method according to claim 14, wherein said ascertaining further comprises determining an amount of said data.

16. The method according to claim 15, wherein said signaling message is a message at the network open system interconnect layer.

17. The method according to claim 16, wherein said wireless communication network is a wireless fidelity network, and said signaling message is a beacon message.

18. The method according to claim 17, wherein said wireless communication system is a cellular telephony network, a global system for mobile communication or a universal telecommunication system network, and said signaling message is a radio resource-level or, respectively, a radio resource control-level message.

19. The method according to claim 18, wherein said radio resource control-level message is a system information message.

20. The method according to claim 19, wherein determining an amount of said data comprises:
   identifying a custom system information message field; and
   retrieving from said custom message field a value corresponding to said amount of data.

21. A device of a wireless communication system, comprising:
   an unallotted space ascertaining unit configured to ascertain a presence of unallotted space in a signaling message to be transmitted related to a predetermined open system interconnect layer of the wireless communication system, said signaling message being intended to transmit signaling information specific of said opening system interconnect layer; and
   an unallotted space filler unit configured to at least partly fill the unallotted space with data different from said signaling information, wherein said data relates to a second open system interconnect layer different from said predetermined open system interconnect layer.

22. The device according to claim 21, comprising a radio access part of the wireless communications network.

23. The device according to claim 21, further comprising:
   a unit configured to ascertain the presence of data in the unallotted space in a received signaling message related to a predetermined open system interconnect layer of the wireless communication system, said signaling message carrying signaling information specific of said open system interconnect layer; and
   a data extractor unit configured to extract said data from the unallotted space.

24. User equipment for use in a wireless communication system, comprising:
   a unit configured to ascertain a presence of data in an unallotted space in a received signaling message related to a predetermined open system interconnect layer of the wireless communication system, said signaling message carrying signaling information specific to said predetermined open system interconnect layer, wherein said data relates to a second open system interconnect layer different from said predetermined open system interconnect layer; and
   a data extractor unit configured to extract said data from the unallotted space.

25. A method of broadcasting data to a plurality of users of a wireless communication system, comprising:
   transmitting said data to the plurality of users by the method of claim 1, wherein said transmission is performed via a broadcast channel of the communication system; and
   transmitting said data to the plurality of users by a method of transmitting a signaling message related to a predetermined open system interconnect layer of a wireless communication system and intended to transmit signaling information specific of said open system interconnect layer, comprising:
   indicating the presence of unallotted space in the signaling message, wherein said indicating comprises indicating that the unallotted space comprises data different from said signaling information, wherein said transmissible data relates to a second open system interconnect layer different from said predetermined open system interconnect layer; and
   said indicating permitting extraction of said data from the unallotted space.

* * * * *